US011911705B2

(12) United States Patent
Bennett, III et al.

(10) Patent No.: US 11,911,705 B2
(45) Date of Patent: Feb. 27, 2024

(54) SCRATCH-OFF LOTTERY TICKET SYSTEM AND METHOD TO ENCOURAGE CONTINUED GAME PLAY AFTER AWARD OF TOP PRIZES

(71) Applicant: Scientific Games, Inc., Alpharetta, GA (US)

(72) Inventors: Joseph W. Bennett, III, Suwanee, GA (US); Kyle Rogers, Cumming, GA (US)

(73) Assignee: Scientific Games, LLC, Alpharetta, GA (US)

( * ) Notice: Subject to any disclaimer, the term of this patent is extended or adjusted under 35 U.S.C. 154(b) by 143 days.

(21) Appl. No.: 17/515,729

(22) Filed: Nov. 1, 2021

(65) Prior Publication Data

US 2022/0134215 A1 May 5, 2022

Related U.S. Application Data

(60) Provisional application No. 63/108,592, filed on Nov. 2, 2020.

(51) Int. Cl.
*A63F 3/06* (2006.01)
*G07F 17/32* (2006.01)

(52) U.S. Cl.
CPC .......... *A63F 3/0665* (2013.01); *G07F 17/329* (2013.01); *G07F 17/3267* (2013.01)

(58) Field of Classification Search
CPC ...... A63F 3/0605; A63F 3/065; A63F 3/0655; A63F 3/0665; G07F 17/3267; G07F 17/329
See application file for complete search history.

(56) References Cited

U.S. PATENT DOCUMENTS

| | | | | |
|---|---|---|---|---|
| 5,743,800 | A | 4/1998 | Huard et al. | |
| 8,221,210 | B2 | 7/2012 | Jubinville | |
| 10,099,114 | B2 * | 10/2018 | Rogers | G07F 17/329 |
| 10,636,254 | B1 * | 4/2020 | Hamman | A63F 3/06 |
| 11,049,367 | B2 * | 6/2021 | Hamman | G07F 17/3267 |

(Continued)

FOREIGN PATENT DOCUMENTS

EP 3 557 544 A1 10/2019

OTHER PUBLICATIONS

EPO Search Report, dated Mar. 25, 2022.

*Primary Examiner* — Milap Shah
(74) *Attorney, Agent, or Firm* — Dority & Manning, P.A.

(57) ABSTRACT

A method and system encourage continued play of scratch-off lottery tickets remaining in a game after award of the seeded top prizes in the game. A total set of scratch-off lottery tickets for the game are subject to a single multi-tier prize structure that includes a top tier prize and a plurality of lower tier prize levels. Subsets of the total set of tickets each have a predetermined winning outcome at one of the lower tier prize levels. A first one of the subsets is divided into qualifying tickets and non-qualifying tickets, the qualifying tickets eligible for play in an additional game having a game prize at least equal to the top tier prize. The qualifying and/or non-qualifying tickets are provided with a printed mark that distinguishes the qualifying tickets from the non-qualifying tickets within the first subset. At redemption, the qualifying tickets are identified and entered into the additional game.

13 Claims, 3 Drawing Sheets

(56) References Cited

U.S. PATENT DOCUMENTS

| | | | | |
|---|---|---|---|---|
| 2003/0116916 | A1* | 6/2003 | Cherry | A63F 3/069 273/292 |
| 2003/0216164 | A1* | 11/2003 | Scrymgeour | G07F 17/329 463/17 |
| 2004/0056416 | A1* | 3/2004 | Bennett, III | G07C 15/00 273/269 |
| 2004/0204222 | A1* | 10/2004 | Roberts | G07F 17/32 463/17 |
| 2007/0057461 | A1* | 3/2007 | Meyer | A63F 3/06 273/269 |
| 2007/0218980 | A1* | 9/2007 | Pachnis | H04L 67/306 463/25 |
| 2008/0045299 | A1* | 2/2008 | Bennett, III | G07C 15/005 463/17 |
| 2009/0061992 | A1* | 3/2009 | Boykin | G07F 17/3267 463/25 |
| 2009/0186680 | A1* | 7/2009 | Napolitano | G07F 17/329 463/17 |
| 2009/0197662 | A1* | 8/2009 | Wright | G07F 17/3244 463/31 |
| 2010/0102546 | A1* | 4/2010 | Rogers | G07F 17/329 283/102 |
| 2010/0190541 | A1* | 7/2010 | Lazar | G07F 17/329 463/17 |
| 2010/0304828 | A1* | 12/2010 | Bettcher | A63F 3/081 463/17 |
| 2011/0081958 | A1* | 4/2011 | Herrmann | G07F 17/3244 463/43 |
| 2012/0149454 | A1 | 6/2012 | Bennett, III et al. | |
| 2013/0337883 | A1* | 12/2013 | Stanek | G07F 17/3272 463/17 |
| 2015/0310696 | A1* | 10/2015 | Mound | G07F 17/3267 463/17 |
| 2019/0340865 | A1 | 11/2019 | Martineck, Sr. | |

* cited by examiner

26

28

30

32

| Tier | Prize Amount | Odds of Winning | Total Prizes |
|---|---|---|---|
| Top tier | $1,000,000 | 1-in-2,297,143 | 14 |
| 2nd | $10,000.00 | 1-in-120,000 | 267 |
| 3rd | $2,000.00 | 1-in-20,000 | 1601 |
| 4th | $1,000.00 | 1-in-12,000 | 2686 |
| 5th | $400.00 | 1-in-3,000 | 10770 |
| 6th | $150.00 | 1-in-2,000 | 16113 |
| 7th | $100.00 | 1-in-296 | 108899 |
| 8th | $50.00 | 1-in-462 | 69850 |
| 9th | $40.00 | 1-in-176 | 182785 |
| 10th | $25.00 | 1-in-120 | 268928 |
| 11th | $20.00 | 1-in-60 | 537610 |
| 12th | $10.00 | 1-in-10 | 3225660 |
| 13th | $5.00 | 1-in-10 | 3225660 |

Overall Odds: 1-in-4.22

SCRATCH-OFF LOTTERY TICKET SYSTEM AND METHOD TO ENCOURAGE CONTINUED GAME PLAY AFTER AWARD OF TOP PRIZES

RELATED APPLICATION

The present Application claims the benefit of Provisional Application No. 63/108,592, filed Nov. 2, 2020.

FIELD OF THE INVENTION

The present invention generally relates to a system and method for implementing a scratch-off lottery ticket game, and more particularly to a method and system that encourages continued play of the scratch-off lottery tickets remaining after award of the seeded top prizes in the game.

BACKGROUND

"Scratch-off" or "instant-win" lottery tickets have enjoyed immense popularity in the lottery industry for decades. These games offer distinct advantages to the lottery authorities and are attractive to a broad spectrum of players.

The scratch-off lottery ticket games typically have a multi-tiered prize structure with relatively few prizes at the top tier level. The number of predetermined winning tickets in each tier increases as the prize tiers are further removed from the top prize tier level. The top prizes can be quite attractive to potential players and are often advertised extensively to draw players to the game.

A number of lottery jurisdictions in the U.S. have adopted the practice of publicizing to players on a periodic basis (e.g., daily or weekly) the number of prizes remaining in each tier of the prize structure. For various reasons, certain of these jurisdictions will also terminate the game when all of the top tier prizes have been awarded. For example, if a particular game has three top prizes worth $500,000 each, the game will end when the last of the three $500,000 prizes has been awarded. The unsold scratch-off lottery tickets remaining in the game are pulled from the point-of-sale locations and are typically destroyed.

The above-described practice is, however, disadvantageous in certain respects. Scratch-off lottery ticket games have a design payout based on play of a percentage of the complete run of lottery tickets in the game (the total number of tickets printed and made available for sale and play of the game). For example, a particular game may have a ticket run of ten million tickets with a design payout of 50%, meaning that half of the money generated by ticket sales is paid out as prizes and the other half of the money constitutes lottery revenue for the jurisdiction. If a game is prematurely ended after the top prizes have been awarded, the payout percentage can be significantly increased to the detriment of the jurisdiction. For example, the game mentioned above having a ticket run of ten million tickets may be terminated after sale of only two million of the tickets because the three top prizes were awarded. The lottery jurisdiction then loses the revenue from sale of up to eight million additional tickets. The payout percentage at the early termination of the game may be, for example, 70% of the proceeds generated by sale of the two million tickets, which is significantly greater than the 50% design payout.

Also, the typical multi-tiered prize structure for scratch-off lottery games includes a relatively large number of lesser, but still very attractive, prizes that continue to generate interest to a great number of players (and revenue for the lottery jurisdiction) even with knowledge that the top prizes are no longer available.

The above scenarios are obviously disadvantageous. The industry and public would benefit from improved methods and game systems to facilitate or encourage continued play of the remaining tickets in a scratch-off lottery ticket game after the top prize(s) have been awarded.

SUMMARY

Objects and advantages of the invention will be set forth in part in the following description, or may be obvious from the description, or may be learned through practice of the invention.

In a particular embodiment of the present invention, a system is provided that encourages and facilitates continued play of scratch-off lottery tickets remaining in a game after the initial seeded top prizes in the game have been awarded. The system includes a total set of scratch-off lottery tickets generated for the game ("the ticket run" for the game). A single multi-tier prize structure is established for the game that includes at least one top tier prize and a plurality of prizes at lower-tier prize levels. A plurality of subsets of the total set of scratch-off lottery tickets is defined, wherein the tickets in a particular subset have a predetermined winning outcome at one of the lower tier prize levels assigned to the respective subset. For example, the multi-tier prize structure may have ten lower tier prize levels (decreasing in value from the top tier prize). For each of these lower tier prize levels, a subset of tickets exists having a predetermined number and winning outcome at the respective lower tier prize value. The number of tickets in each subset is computed to give an overall designed odds of winning at each lower tier prize level.

In accordance with aspects of the invention, a first one the subsets is further divided into qualifying tickets and non-qualifying tickets. The qualifying tickets within the subset are eligible for play in an additional game having an additional game prize that is at least equal in value to the top tier prize. One or both of the qualifying tickets or the non-qualifying tickets are provided with a printed mark that visibly distinguishes the qualifying tickets from the non-qualifying tickets within the first subset. This mark may be an imagined mark that is provided under a scratch-off-coating (SOC) layer on the ticket. Upon redemption by players of the qualifying tickets and the non-qualifying tickets for the lower tier prize assigned to the first subset, the qualifying tickets are identified and entered into the additional game, which may be played at that time or a later time.

In a particular embodiment, the qualifying tickets have the printed mark thereon in a form that positively identifies the scratch-off lottery ticket as one of the qualifying tickets. This mark may be visibly discernable by a player. For example, in one embodiment, the printed mark may be provided under the SOC layer on the ticket, such as the SOC layer that covers the game play indicia on the ticket. Once revealed, the printed mark can positively inform the player that the ticket qualifies for the additional game.

In addition, it may be desirable in certain embodiments if the non-qualifying tickets have a form of the printed mark thereon that positively identifies the scratch-off lottery ticket as one of the non-qualifying tickets.

In a certain embodiment, the lower tier prize level assigned to the first subset is the second-highest prize level in the multi-tier prize structure (only the top tier prize is greater).

It is also contemplated that the subset associated with one or more of the additional lower tier prize levels is also divided into qualifying and non-qualifying tickets as described above, wherein the qualifying tickets are eligible for play in the additional game. Although the additional game prize my still be at the same value as the top tier prize, the odds of winning in the additional game may be lower for the qualifying tickets in such subset.

The system may include a plurality of physical redemption locations within a jurisdiction in which the total set of scratch-off lottery tickets is authorized for play, wherein the scratch-off lottery tickets in the first subset are presented by players for validation and collection of the lower tier prize assigned to the first subset. The physical redemption locations can be configured with a scanner to scan the printed mark, as well as a code, on the scratch-off lottery tickets to identify the qualifying tickets from the non-qualifying tickets. In this embodiment, the printed mark may visibly discernable by the players before scanning at the physical redemption location. In other words, the player will know if their ticket is a qualifying ticket before redeeming the ticket at the redemption location. The code may be in addition to the printed mark and can be linked to a validation file generated for the scratch-off lottery ticket in a computer database that identifies the scratch-off lottery ticket as a qualifying ticket.

It may be desired in certain embodiments if the number of qualifying tickets in the first subset is greater than the number of non-qualifying tickets in the same subset.

The additional game may be configured as an instant random event game played for each of the qualifying tickets at a time of redemption of the qualifying ticket, such as a conventional "pick-3" or "pick-4" type of game, or the like.

The present invention also encompasses embodiments of a method to encourage continued play of scratch-off lottery tickets remaining in a game after award of the seeded top prizes in the game. The method includes generating a total set of scratch-off lottery tickets for the game, and establishing a single multi-tier prize structure for the game that includes at least one top tier prize and a plurality of prizes at lower tier prize levels. The method defines a plurality of subsets of the total set of scratch-off lottery tickets, each of the subsets comprising a predefined number of the scratch-off lottery tickets having a predetermined winning outcome at one of the lower tier prize levels assigned to the subset. The method includes designating a first one the subsets and dividing the scratch-off lottery tickets in the first subset into qualifying tickets and non-qualifying tickets, the qualifying tickets eligible for play in an additional game having an additional game prize that is at least equal in value to the top tier prize. The method also includes providing one or both of the qualifying tickets or the non-qualifying tickets with a printed mark that visibly distinguishes the qualifying tickets from the non-qualifying tickets within the first subset. The method also includes, upon redemption by players of the qualifying tickets and the non-qualifying tickets for the lower tier prize assigned to the first subset, using the printed mark to identify and enter the qualifying tickets into the additional game.

BRIEF DESCRIPTION OF THE DRAWINGS

A full and enabling disclosure including the best mode of practicing the appended claims and directed to one of ordinary skill in the art is set forth more particularly in the remainder of the specification. The specification makes reference to the appended figures, in which:

DETAILED DESCRIPTION

Reference will now be made in detail to various and alternative exemplary embodiments and to the accompanying drawings, with like numerals representing substantially identical structural elements. Each example is provided by way of explanation, and not as a limitation. In fact, it will be apparent to those skilled in the art that modifications and variations can be made without departing from the scope or spirit of the disclosure and claims. For instance, features illustrated or described as part of one embodiment may be used on another embodiment to yield a still further embodiment. Thus, it is intended that the present disclosure includes modifications and variations as come within the scope of the appended claims and their equivalents.

Generally, the present disclosure is directed to a scratch-off lottery ticket game system and method that facilitate continued play (including sale) of the tickets that remain after the top prize(s) in the game have been awarded.

Figure 1:
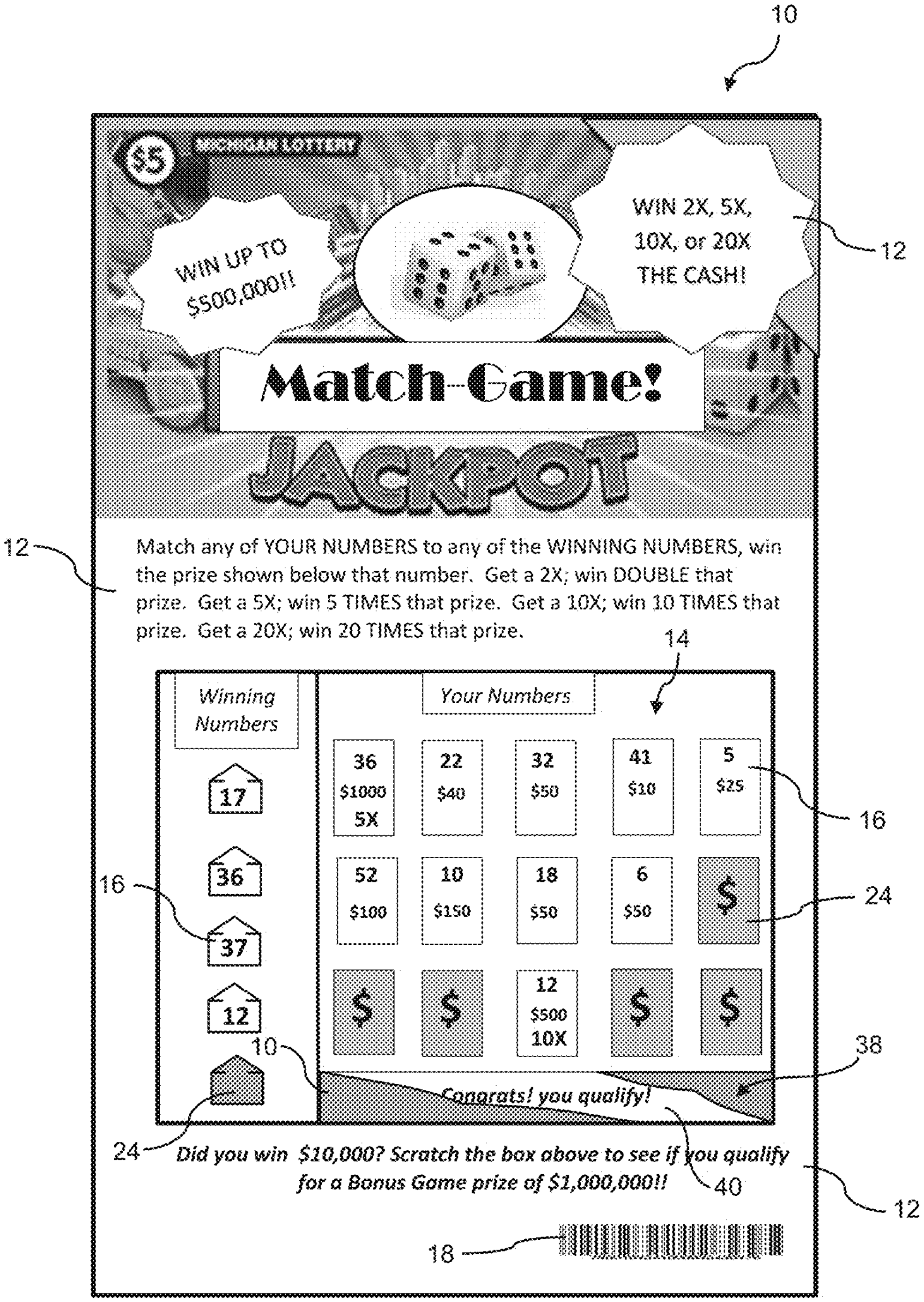
FIG. 1 depicts a qualified scratch-off lottery ticket specifically configured for use in the present system and method.
Figures 2, 3:
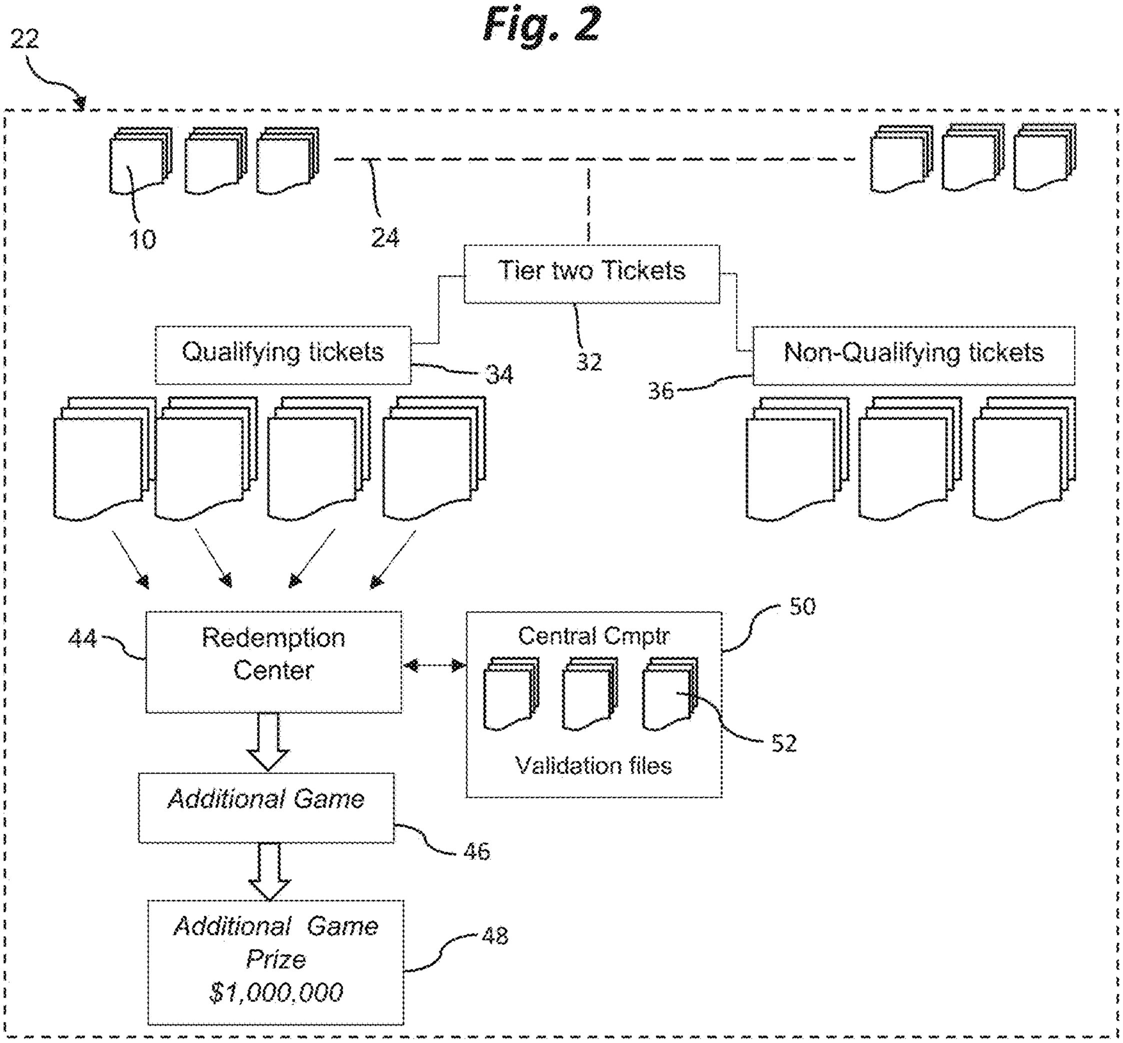
FIG. 2 is a table representing a multi-tiered prize structure for a scratch-off lottery ticket game.
FIG. 3 depicts a system in accordance with aspects of the invention.

In an embodiment of the system and method depicted in FIG. 3, the scratch-off lottery ticket game system 22 includes a total set 24 of scratch-off lottery tickets 10 generated for a common game ("the ticket run" for the game). For example, referring to FIG. 1, the total set 24 would encompass all of the scratch-off lottery tickets 10 produced for the "Match-Game! Jackpot" game.

A single multi-tier prize structure 26 (FIG. 2) is established for the game that includes at least one top tier prize 28 and a plurality of lower-tier prize levels 30. In the depicted embodiment, there are fourteen (14) top tier prizes 28 of $1,000,000 each. A plurality of subsets 32 of the total set 24 of scratch-off lottery tickets 10 is defined, wherein the number of the tickets 10 in a particular subset 32 is predetermined and each ticket 10 has a predetermined winning outcome at one of the lower tier prize levels 30. For example, referring to FIG. 2, there is a subset 32 of 267 tickets assigned to the $2^{nd}$ tier prize level 30, with each ticket having a predetermined prize value of $10,000. There is another subset 32 of 1601 tickets assigned to the $3^{rd}$ tier prize level 30, with each ticket having a predetermined prize value of $2,000. The additional subsets 32 and associated lower-tier prize levels 30 are readily understood from FIG. 2.

Referring to FIG. 3, a first one the subsets 32 (e.g., the subset 32 associated with the $2^{nd}$ tier prize level) is further divided into qualifying tickets 34 and non-qualifying tickets 36. The qualifying tickets 34 are eligible for play in an additional game 46, which has an additional game prize 48 associated therewith that is at least equal in value to the top tier prizes 28.

FIG. 1 depicts an embodiment of a scratch-off lottery ticket 10 that is uniquely configured for the present game system 22. The ticket 10 includes game instruction graphics and indicia 12 printed thereon that explain to a player how to play the game embodied on the ticket 10, as well as what constitutes a winning ticket and the prize amounts. The game instruction indicia 20 may be considered as "static" indicia in that, for a given common game, it does not change from one ticket 10 to the other.

The tickets 10 may be printed paper tickets, or may be electronically simulated tickets 10 that are transmitted to and played by the player via an application running on a smart device, such as a mobile phone, tablet, computer, etc.

Still referring to FIG. 1, as is well-known to players of scratch-off lottery tickets, each ticket 10 includes a game play area 16 wherein variable game play indicia 16 is provided and covered by a scratch-off coating (SOC) layer 20. In order to reveal the winning or losing status of the ticket 10, the player removes the SOC layer 22 to uncover the underlying game play indicia 16. Thus, the game play indicia 16 is "variable" indicia in that it changes from one master ticket 14 to another. In the depicted common game embodied by the ticket 10 in the figures, the player is presented with a series (5) of "Winning Numbers" in the left-hand side of the game play area 14 covered by the SOC layer 24. A matrix of "Your Numbers" is provided in the right-hand side of the game player area 14. The game instruction indicia 20 conveys to the player that a match of any of the "Your Numbers" with any of the "Winning Numbers" wins the prize show below the number, as well as other prize multipliers.

Referring to FIGS. 1 and 3, one or both of the qualifying tickets 34 or the non-qualifying tickets 36 are provided with a printed mark 38 that visibly distinguishes the qualifying tickets 34 from the non-qualifying tickets 36 within the first subset 32. This mark 38 may be alpha-numeric, a symbol, a picture, or virtually any other type of mark 38 that is visibly discernable by the player. In FIG. 1, the ticket 10 is a qualifying ticket 34 and the printed mark 38 is in a form 40 that positively identifies the ticket 10 as a qualifying ticket 34. For example, the qualifying ticket mark 40 uses a word phrase to positively identify the ticket 10 as a qualifying ticket 34. The printed mark 38 may be under a SOC layer, as depicted in FIG. 1.

They system 22 and associated method call for a player in possession of a ticket 10 in the subset 32 associated with the lower-tier prize level 30 to present the ticket 10 for validation and redemption of the prize. This applies to qualifying 34 and non-qualifying tickets 36. Lottery jurisdictions typically have an established prize level (e.g., $600 or greater) where the player is required to present the ticket to an authorized redemption center/location 44 (FIG. 3) for this purpose, although this is not a requirement of the present disclosure. Redemption and validation may be done, for example, virtually or electronically. Upon redemption, qualifying tickets 34 are identified and entered into the additional game 46.

Figure 4:
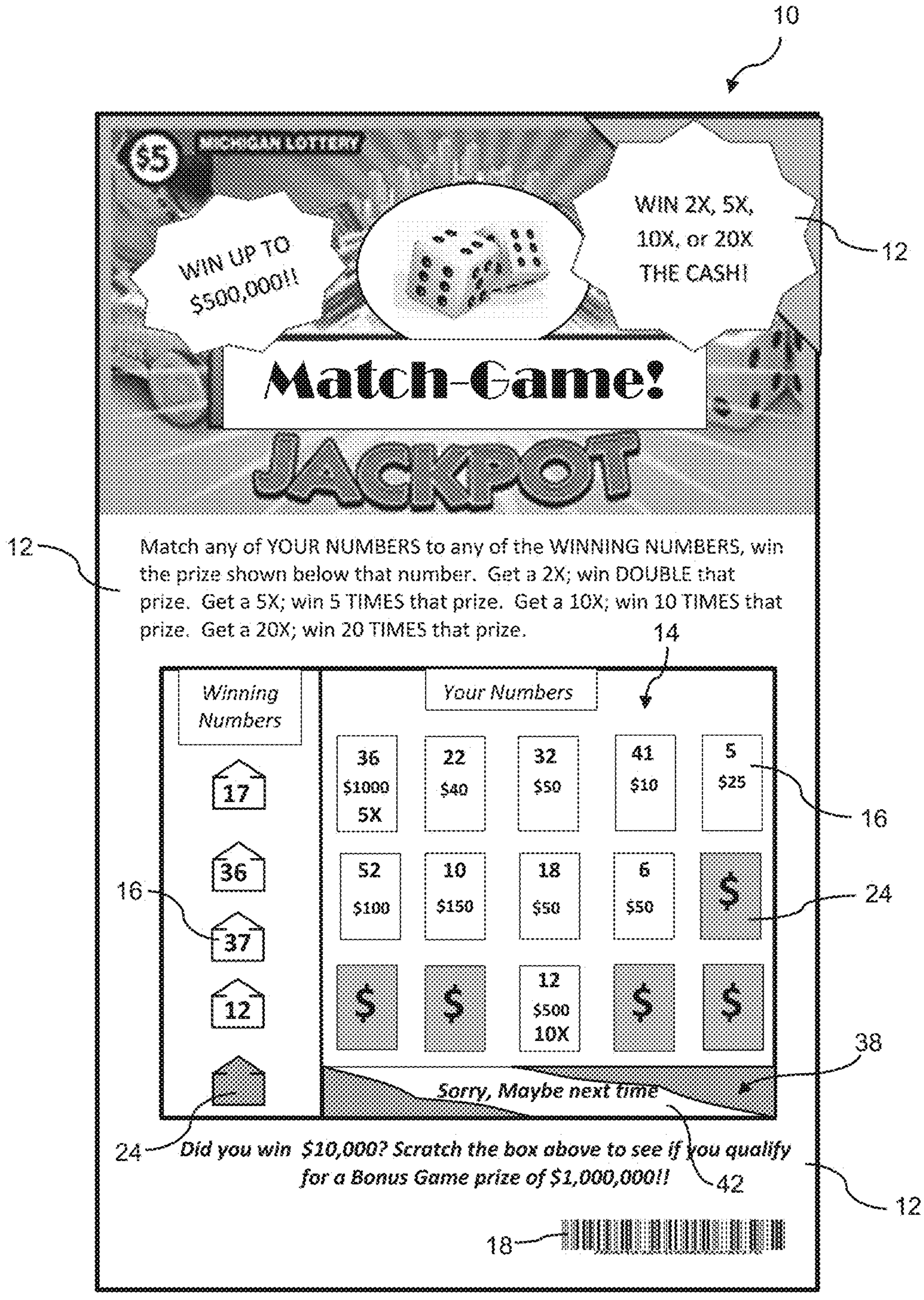
FIG. 4 depicts a qualified scratch-off lottery ticket specifically configured for use in the present system and method.

Referring to FIG. 4, it may also be desired to include a form of the printed mark 38 on tickets 10 within the subset 32 that are non-qualifying tickets 36 (FIG. 3). The ticket 10 if FIG. 4 includes a non-qualifying ticket mark 42 under a SOC layer that is visibly discernable to the player and positively identifies the ticket 10 as a non-qualifying ticket 34.

In a particular embodiment depicted in the figures, the lower tier prize level 30 assigned to the first subset 32 has the highest value in the multi-tier prize structure 26 below the first top tier prize 28. Thus, the 267 tickets within the subset 32 associated with this lower-tier prize level are divided (equally or non-equally) into the qualifying tickets 34 and the non-qualifying tickets 36. Embodiments are also feasible wherein one or more additional subsets 32 associated with other ones of the lower-tier prize levels 30 (e.g., the 3$^{rd}$ and 4$^{th}$ levels) are also divided into qualifying tickets 34 and non-qualifying tickets 34. Each of these additional subsets 32 may have its own additional game 46 and additional game prize 48, which may be equal in value to the top tier prize 28 or of lesser value. If this additional game prize 48 is of equal value to the top tier prize 28, the additional game 46 may be structured such that the odds of winning are less as compared to the odds in the additional game 46 conducted for the first subset 32.

Referring to the tickets 10 in FIGS. 1 and 4, each ticket may include a validation code 18 printed thereon, which may also be covered by a SOC layer, that links the ticket 10 to a validation file 52 (FIG. 3) contained in a central server or computer system 50 (or otherwise accessible by the central server/computer 50). Those skilled in the art appreciate that the validation file 52 contains ticket-specific information for validation and pay-out (redemption) of the ticket 10, including whether or not the ticket is qualifying ticket 34 that entitles the player to play of the additional game 46. In the embodiment discussed above wherein the tickets 10 are presented to a physical redemption center/location 44 for validation and redemption of the prize, a scanner can be used to read the code 18 for verifying (via the ticket-specific information contained in the respective validation file 52) whether the ticket 10 is a valid qualifying ticket 34.

For embodiments wherein a scanner is used during the validation/redemption process, the printed mark 38 on the qualifying tickets 34 need not be discernable by the player but need only be visually detectable by the scanner. For example, the mark 38 may be a symbol or other graphic (other than the validation code 18) that is hidden in the background graphics of the ticket 10 or otherwise camouflaged from the player. In this embodiment, the player would not know whether the ticket 10 they are holding is a qualifying ticket 34 or non-qualifying ticket 36 prior to validation/redemption of the ticket 10.

The additional game 46 may be conducted in various ways. In one embodiment, the additional game 46 may be an "instant-win" game, such as well-known Pic-3 and Pic-4 type games, wherein the player picks a defined number of objects (e.g., numbers) from a larger group of the objects. A computer randomly designates objects from the larger group and if the objects picked by the player match the randomly-designated objects, the player wins the game. The odds of winning in this type of random-generation event game can be defined by the number of objects in the larger field and the number of player picks.

Any other suitable random-generation event game may be envisioned for the additional game 46.

The technology discussed herein makes reference to servers, computers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

The material particularly shown and described above is not meant to be limiting, but instead serves to show and teach various exemplary implementations of the present subject matter. As set forth in the attached claims, the scope of the present invention includes both combinations and sub-combinations of various features discussed herein, along with such variations and modifications as would occur to a person of skill in the art.

What is claimed is:

1. A system to encourage continued play of scratch-off lottery tickets remaining in a game after award of seeded top prizes in the game, the system comprising:

a total set of scratch-off lottery tickets generated for the game, wherein a single multi-tier prize structure is applied to game that includes at least one top tier prize and a plurality of prizes at lower tier prize levels, each of the lottery tickets including a scratch-off coating covering game indicia that indicates a winning or losing status of the lottery ticket;

a plurality of subsets of the total set of scratch-off lottery tickets, each of the subsets comprising a predefined number of the scratch-off lottery tickets having a predetermined winning outcome at one of the lower tier prize levels assigned to the subset;

each of the subsets divided into qualifying tickets and non-qualifying tickets, the qualifying tickets in each of the subsets eligible for play in a respective additional game associated only with the subset and having an additional game prize, wherein the additional game prize of at least one of the subsets is at least equal in value to the top tier prize;

each of the qualifying tickets and the non-qualifying tickets provided with a printed mark that visibly and positively identifies the lottery ticket as either a qualifying ticket or a non-qualifying ticket; and wherein upon redemption by players of the qualifying tickets and the non-qualifying tickets for the respective lower tier prize assigned to each of the subsets, the qualifying tickets are identified and entered into the respective additional game associated with the subset to which the qualifying ticket belongs.

2. The system of claim 1, wherein the printed mark is under a scratch-off coating applied on the scratch-off lottery ticket.

3. The system of claim 1, wherein only one of the subsets has an additional game prize at least equal to the top tier prize, the remaining subsets each having an additional game prize less that the top tier prize.

4. The system of claim 1, comprising a plurality of physical redemption locations within a jurisdiction in which the total set of scratch-off lottery tickets is authorized for play and the scratch-off lottery tickets in the plurality of subsets are presented by players for validation and collection of the lower tier prize assigned to the respective subset, the physical redemption locations configured with a scanner to scan the printed mark or a code on the scratch-off lottery tickets to identify the qualifying tickets from the non-qualifying tickets.

5. The system of claim 4, wherein the code is provided on the scratch-off lottery tickets in addition to the printed mark, the code linked to a validation file assigned to the scratch-off lottery ticket in a computer database that identifies the scratch-off lottery ticket as a qualifying ticket.

6. The system of claim 1, wherein a number of the qualifying tickets in at least one subset is greater than a number of the non-qualifying tickets.

7. The system of claim 1, wherein the respective additional game for each of the subsets is an instant random event game played for each of the qualifying tickets at a time of redemption of the qualifying ticket.

8. A method to encourage continued play of scratch-off lottery tickets remaining in a game after award of seeded top prizes in the game, the method comprising:

generating a total set of scratch-off lottery tickets for the game, each of the lottery tickets including a scratch-off coating covering game indicia that indicates a winning or losing status of the lottery ticket;

establishing a single multi-tier prize structure for the game that includes at least one top tier prize and a plurality of prizes at lower tier prize levels;

defining a plurality of subsets of the total set of scratch-off lottery tickets, each of the subsets comprising a predefined number of the scratch-off lottery tickets having a predetermined winning outcome at one of the lower tier prize levels assigned to the subset;

designating the scratch-off lottery tickets in each of the subsets into qualifying tickets and non-qualifying tickets, the qualifying tickets eligible for play in an additional game associated only with the respective subset and having an additional game prize, wherein the additional game prize of at least one of the subsets is at least equal in value to the top tier prize;

providing each of the qualifying tickets and the non-qualifying tickets within each subset with a printed mark that visibly and positively distinguishes the lottery ticket as either one of the qualifying tickets or the non-qualifying tickets within the respective subset; and upon redemption by players of the qualifying tickets and the non-qualifying tickets for the respective lower tier prize assigned to each of the subsets, using the printed mark to identify and enter the qualifying tickets into the additional game associated with the respective subset to which the qualifying ticket belongs.

9. The method of claim 8, wherein the printed mark is visibly discernable by a player and provided under a scratch-off coating applied on the scratch-off lottery ticket.

10. The method of claim 8, wherein only one of the subsets has an additional game prize at least equal to the top tier prize, the remaining subsets each having an additional game prize less that the top tier prize.

11. The method of claim 8, further comprising validating and redeeming the scratch-off lottery tickets in the subsets at one of a plurality of physical redemption locations within a jurisdiction in which the total set of scratch-off lottery tickets are authorized for play, and conducting the additional game associated with the respective subset to which the qualifying ticket belongs at the physical redemption location.

12. The method of claim 11, comprising providing a code on the scratch-off lottery tickets in addition to the printed mark, the code linked to a validation file assigned to the scratch-off lottery ticket in a computer database that identifies the scratch-off lottery ticket as a qualifying ticket.

13. The method of claim 8, for at least one of the subsets, identifying a greater number of qualifying tickets than a number of the non-qualifying tickets.

* * * * *